(12) United States Patent
Mishra et al.

(10) Patent No.: US 12,455,811 B2
(45) Date of Patent: Oct. 28, 2025

(54) SYSTEM AND METHODS FOR SELF-SERVICE TEST DATA FOR WEB APPLICATIONS

(71) Applicant: Dell Products L.P., Round Rock, TX (US)

(72) Inventors: Abhishek Mishra, Bangalore (IN); Anusha N, Bangalore (IN); Apoorva Neyyanira Ravi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 18/214,567

(22) Filed: Jun. 27, 2023

(65) Prior Publication Data
US 2025/0004924 A1    Jan. 2, 2025

(51) Int. Cl.
*G06F 11/3668* (2025.01)
*H04L 67/56* (2022.01)

(52) U.S. Cl.
CPC .......... *G06F 11/3684* (2013.01); *H04L 67/56* (2022.05)

(58) Field of Classification Search
None
See application file for complete search history.

(56) References Cited

U.S. PATENT DOCUMENTS

| | | | |
|---|---|---|---|
| 9,203,931 B1* | 12/2015 | Ngo | H04L 67/02 |
| 2006/0271671 A1* | 11/2006 | Hansen | H04L 67/535 |
| | | | 709/224 |
| 2008/0077983 A1* | 3/2008 | Meyer | H04L 63/0815 |
| | | | 715/234 |
| 2009/0182803 A1* | 7/2009 | Barton | G06F 16/9577 |
| | | | 709/203 |
| 2013/0173219 A1* | 7/2013 | Lin | G06F 11/3409 |
| | | | 702/186 |
| 2013/0191920 A1* | 7/2013 | Amit | G06F 21/552 |
| | | | 726/25 |
| 2014/0007055 A1* | 1/2014 | Tran | G06F 11/3668 |
| | | | 717/124 |
| 2014/0215439 A1* | 7/2014 | Krishnan | G06F 11/3688 |
| | | | 717/124 |

OTHER PUBLICATIONS

"Parsing Nginx Logs Using Python"; Dev.to blogsite; Feb. 26, 2023 (Year: 2023).*

(Continued)

*Primary Examiner* — Bradley A Teets
*Assistant Examiner* — Clint Thatcher
(74) *Attorney, Agent, or Firm* — Krishnendu Gupta; Lesley Leonessa (57) ABSTRACT

Methods, system, and non-transitory processor-readable storage medium for a digifootprint use case capturing system are provided herein. An example method includes a listener module that receives a Hypertext Transfer Protocol (HTTP) request from a client system, where the reverse proxy server intercepts the HTTP request between the client system and a server. A listener module associated with the reverse proxy server captures a digital footprint of the HTTP request, and a transmitter module updates an automation code repository with normalized test data obtained from the digital footprint.

20 Claims, 10 Drawing Sheets

User 1 – Session X
Graph G1

User 2 – Session Y
Graph G2

User 3 – Session Z
Graph G3

User 4 – Session XY
Graph G4

(56) References Cited

OTHER PUBLICATIONS

"Use a reverse proxy to record all incoming HTTP request, then execute it in a clone server for performance testing"; Serverfault.com website [full URL included in ref.]; Oct. 20, 2010 (Year: 2010).*

Rick Nelson; "Using NGINX Logging for Application Performance Monitoring"; NGINX Community Blog page (blog.nginx.org) [full URL included in ref.];Jan. 7, 2016 (Year: 2016).*

"What is a Reverse Proxy?"; Cloudflare.com website [full URL indcluded in ref.] as captured by the Wayback Machine Internet Archive (archive.org) on May 17, 2023 (Year: 2023).*

* cited by examiner

| |
|---|
| NODE |
| URI |
| ARGUMENT LIST |
| SESSION ID |
| RESPONSE STATUS CODE |

| N1 |
|---|
| /SEARCH |
| {name:'canvas painting'} |
| j6oAOxCWZh/CD723LGeXlf |
| 200 |

FIG. 6B

| N2 |
|---|
| /SEARCH |
| {name:'canvas painting'} |
| j6oAOxCWZh/CD723LGeXlf |
| 503 |

User 1 – Session X
Graph G1

User 2 – Session Y
Graph G2

User 3 – Session Z
Graph G3

User 4 – Session XY
Graph G4

SYSTEM AND METHODS FOR SELF-SERVICE TEST DATA FOR WEB APPLICATIONS

FIELD

The field relates generally to generating test data, and more particularly to generating test data in web applications in information processing systems.

BACKGROUND

Once a web application is released to production, it generally undergoes continuing enhancements and bug fixes. These enhancements and/or bug fixes can involve an update to the front-end or back-end, or a change on the interface. In any Software Development Lifecycle (SDLC) approach, testers test the requirements in every sprint/release using different test strategies and approaches. In most of the cases, this testing takes place in staging/pre-production environment before releasing the web application to the production environment.

SUMMARY

Illustrative embodiments provide techniques for implementing a digifootprint use case capturing system in a storage system. For example, illustrative embodiments provide a digifootprint use case capturing system that receives, by a reverse proxy server, a Hypertext Transfer Protocol (HTTP) request from a client system, where the reverse proxy server intercepts the HTTP request between the client system and a server. A listener module associated with the reverse proxy server captures a digital footprint of the HTTP request, and a transmitter module updates an automation code repository with normalized test data obtained from the digital footprint. Other types of processing devices can be used in other embodiments. These and other illustrative embodiments include, without limitation, apparatus, systems, methods and processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a digifootprint use case capturing system, which technique may be used to provide, among other things generation of test data in web applications. The digifootprint use case capturing system receives, by a reverse proxy server, an HTTP request from a client system, where the reverse proxy server intercepts the HTTP request between the client system and a server. A listener module associated with the reverse proxy server captures a digital footprint of the HTTP request, and a transmitter module updates an automation code repository with normalized test data obtained from the digital footprint. Other types of processing devices can be used in other embodiments.

Development of web applications include many enhancements with every sprint/release. Web applications with rich, layered user interfaces with thousands of user interface (UI) elements require updates in the test scripts that test these elements. The time and resources needed to create/update test scripts to test the new enhancements, new and/or updated web elements are directly proportional to the changes and/or new features in each release. The maintenance of the test scripts is prone to human errors and/or omission of test coverage.

Conventional technologies focus on covering each functionality of the web application irrespective of their scale of usage in production, leading to over testing of some areas while other areas with a high scale of usage in production are left untested. Conventional technologies fail to focus testing on maximum business risk coverage. Conventional technologies for generating test data do not intercept user actions and obtain real time test data from Application Programming Interface (API) calls. Conventional technologies do not optimize the real time test data. Conventional technologies do not provide self-service test data to an automation code repository. Conventional technologies do not reduce overall testing efforts by generating self-service test data in real time. Conventional technologies do not improve accuracy by minimizing production defects using the real time test data from the production environment. Conventional technologies do not improve accuracy by covering key business testing areas using the real time test data from the production environment. Conventional technologies do not increase efficiency by obtaining test data from domain experts and actual users, thereby maximizing the testing of key scenarios for business. Conventional technologies do not increase efficiency by reducing the over-testing of areas that are not key scenarios for business. Conventional technologies do not generate test data for functional and non-functional testing, such as load testing and/or stress testing. Conventional technologies do not allow users to create and run tests on their own schedule, which is especially helpful for organizations with multiple teams working on different projects. Conventional technologies do not provide self-service testing systems that allow multiple users to work together on the same test, thereby making it easier to share knowledge and ideas, and to collaborate on the testing process. Conventional technologies do not provide self-service testing systems that are more scalable than traditional testing methods, since users can create and run tests on their own, without needing to rely on a dedicated testing team to create the necessary tests. This facilitates handling large number of tests and the actual testing of multiple projects at once. Conventional technologies do not provide self-service testing systems that eliminate the need for manual testing and reduce the number of manual testers needed.

By contrast, in at least some implementations in accordance with the current technique as described herein, a digifootprint use case capturing system receives, by a reverse proxy server, an HTTP request from a client system, where the reverse proxy server intercepts the HTTP request between the client system and a server. A listener module associated with the reverse proxy server captures a digital footprint of the HTTP request, and a transmitter module updates an automation code repository with normalized test data obtained from the digital footprint.

Thus, a goal of the current technique is to provide a method and a system for a digifootprint use case capturing tool that provides the quality assurance team with real time test data and test scenarios that come directly from end users, thereby increasing the business risk coverage and early detection of defects. Another goal is to generate test data by intercepting user actions and obtaining real time test data from API calls. Another goal is to optimize the real time test data. Another goal is to provide self-service test data to an automation code repository. Another goal is to reduce overall testing efforts by generating self-service test data in real time. Another goal is to improve accuracy by minimizing production defects using the real time test data from the production environment. Another goal is to improve accuracy by covering key business testing areas using the real time test data from the production environment. Another goal is to increase efficiency by obtaining test data from domain experts and actual users, thereby maximizing the testing of key scenarios for business. Another goal is to increase efficiency by reducing the over-testing of areas that are not key scenarios for business. Another goal is to generate test data for functional and non-functional testing, such as load testing and/or stress testing. Another goal is to allow users to create and run tests on their own schedule. Another goal is to generate self-service test data in real time. Another goal is to provide self-service testing systems that allow multiple users to work together on the same test, thereby making it easier to share knowledge and ideas, and to collaborate on the testing process. Another goal is to provide self-service testing systems that are more scalable than traditional testing methods, since users can create and run tests on their own, without needing to rely on a dedicated testing team to create the necessary tests. Another goal is to provide self-service testing systems that eliminate the need for manual testing and reduce the number of manual testers needed. Another goal is to provide test data as close to production data as possible for meaningful User Acceptance Testing (UAT) results. Another goal is to increase the coverage of testing with real time data increases the probability of uncovering defects. Yet another goal is to update Automation Test Scripts with any new or updated web elements in the web applications.

In at least some implementations in accordance with the current technique described herein, the use of a digifootprint use case capturing system can provide one or more of the following advantages: providing the quality assurance team with real time test data and test scenarios that come directly from end users, thereby increasing the business risk coverage and early detection of defects, generating test data by intercepting user actions and obtaining real time test data from API calls, optimizing the real time test data, providing self-service test data to an automation code repository, reducing overall testing efforts by generating self-service test data in real time, improving accuracy by minimizing production defects using the real time test data from the production environment, improving accuracy by covering key business testing areas through the use of the real time test data from the production environment, increasing efficiency by obtaining test data from domain experts and actual users, thereby maximizing the testing of key scenarios for business, increasing efficiency by reducing the over-testing of areas that are not key scenarios for business, generating test data for functional and non-functional testing, such as load testing and/or stress testing, allowing users to create and run tests on their own schedule, providing self-service testing systems that allow multiple users to work together on the same test, thereby making it easier to share knowledge and ideas, and to collaborate on the testing process, providing self-service testing systems that are more scalable than traditional testing methods, since users can create and run tests on their own, without needing to rely on a dedicated testing team to create the necessary tests, providing provide self-service testing systems that eliminate the need for manual testing, and reduce the number of manual testers needed, providing test data as close to production data as possible for meaningful UAT results, increasing the coverage of testing with real time data increases the probability of uncovering defects, and updating Automation Test Scripts with any new or updated web elements in the web applications.

In contrast to conventional technologies, in at least some implementations in accordance with the current technique as described herein, a digifootprint use case capturing system receives, by a reverse proxy server, an HTTP request from a client system, where the reverse proxy server intercepts the HTTP request between the client system and a server. A listener module associated with the reverse proxy server captures a digital footprint of the HTTP request, and a transmitter module updates an automation code repository with normalized test data obtained from the digital footprint.

In an example embodiment of the current technique, the listener module logs an API call associated with a client server session, where the client server session comprises the HTTP request intercepted between the client system and the server.

In an example embodiment of the current technique, the listener module retrieves uniform resource identifier (URI) information and an argument list from the HTTP request received from the client system and stores the URI information and the argument list in a data structure.

In an example embodiment of the current technique, the listener module retrieves a status code associated with an HTTP response, where the HTTP response is received in response to the HTTP request transmitted to the server and updates a data structure with the status code.

In an example embodiment of the current technique, the data structure comprises URI information and an argument list from the HTTP request.

In an example embodiment of the current technique, the listener module stores a session identifier, associated with the HTTP request transmitted from the client system to the server, in a data structure.

In an example embodiment of the current technique, the data structure comprises URI information, an argument list from the HTTP request, and a status code associated with an HTTP response, where the HTTP response is received in response to the HTTP request transmitted to the server.

In an example embodiment of the current technique, the digifootprint use case capturing system updates the automation code repository with normalized test data in real time as user navigation on the client system invokes the HTTP request.

In an example embodiment of the current technique, the digifootprint use case capturing system identifies a graph data structure associated with a user session on the client system, where the graph data structure is comprised of at least one node data structure.

In an example embodiment of the current technique, the node data structure comprises a session identifier associated with the user session, URI information, an argument list from the HTTP request, and a status code associated with an HTTP response, where the HTTP response is received in response to the HTTP request transmitted to the server.

In an example embodiment of the current technique, the consolidator module analyzes a plurality of graph data structures, where each graph data structure is comprised of a plurality of node data structures and identifies a subset of the plurality of the graph data structures that are associated with a success status code, where the success status code is associated with an HTTP response received in response to the HTTP request transmitted to the server.

In an example embodiment of the current technique, each of the plurality of node data structures associated with a graph data structure is associated with a session id associated with the HTTP request.

In an example embodiment of the current technique, the consolidator module normalizes the subset of the plurality of the graphs associated with the success status codes.

In an example embodiment of the current technique, the digifootprint use case capturing system removes duplicates from the normalized subset of the plurality of graphs.

In an example embodiment of the current technique, the digifootprint use case capturing system generates normalized test data from the normalized subset of the plurality of graphs.

In an example embodiment of the current technique, the digifootprint use case capturing system appends a respective API URI and argument list to each of the normalized subset of the plurality of graphs.

In an example embodiment of the current technique, the digifootprint use case capturing system transmits the normalized test data to the automation code repository.

In an example embodiment of the current technique, the digifootprint use case capturing system deduplicates the normalized test data with test data in the automation code repository.

Figure 1:
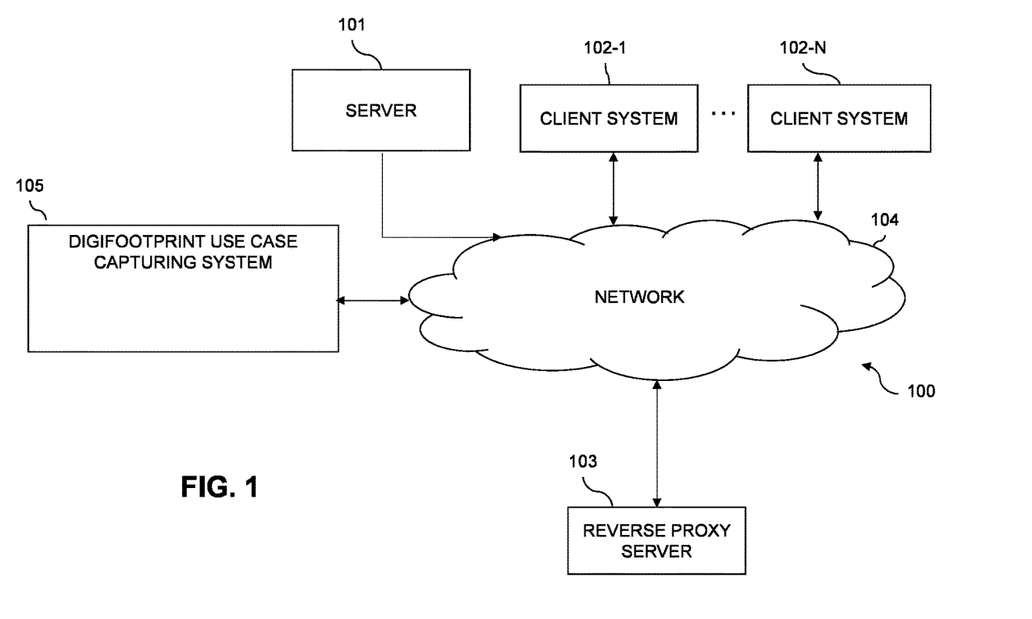
FIG. 1 shows an information processing system including a digifootprint use case capturing system in an illustrative embodiment.

FIG. 1 shows a computer network (also referred to herein as an information processing system) 100 configured in accordance with an illustrative embodiment. The computer network 100 comprises a server 101, digifootprint use case capturing system 105, reverse proxy server 103, and client systems 102-N. The server 101, digifootprint use case capturing system 105, reverse proxy server 103, and client systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. The digifootprint use case capturing system 105 may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the client systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the digifootprint use case capturing system 105 are one or more input-output devices, which illustratively comprise keyboards, displays or other types of input-output devices in any combination. Such input-output devices can be used, for example, to support one or more user interfaces to the digifootprint use case capturing system 105, as well as to support communication between the digifootprint use case capturing system 105 and other related systems and devices not explicitly shown. For example, a dashboard may be provided for a user to view a progression of the execution of the digifootprint use case capturing system 105. One or more input-output devices may also be associated with any of the client systems 102-N.

Additionally, the digifootprint use case capturing system 105 in the FIG. 1 embodiment is assumed to be implemented using at least one processing device. Each such processing device generally comprises at least one processor and an associated memory, and implements one or more functional modules for controlling certain features of the digifootprint use case capturing system 105.

More particularly, the digifootprint use case capturing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the digifootprint use case capturing system 105 to communicate over the network 104 with the server 101, and client systems 102-N and illustratively comprises one or more conventional transceivers.

A digifootprint use case capturing system 105 may be implemented at least in part in the form of software that is stored in memory and executed by a processor, and may reside in any processing device. The digifootprint use case capturing system 105 may be a standalone plugin that may be included within a processing device.

It is to be understood that the particular set of elements shown in FIG. 1 for digifootprint use case capturing system 105 involving the server 101, and client systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the digifootprint use case capturing system 105 can be on and/or part of the same processing platform.

Figure 2:
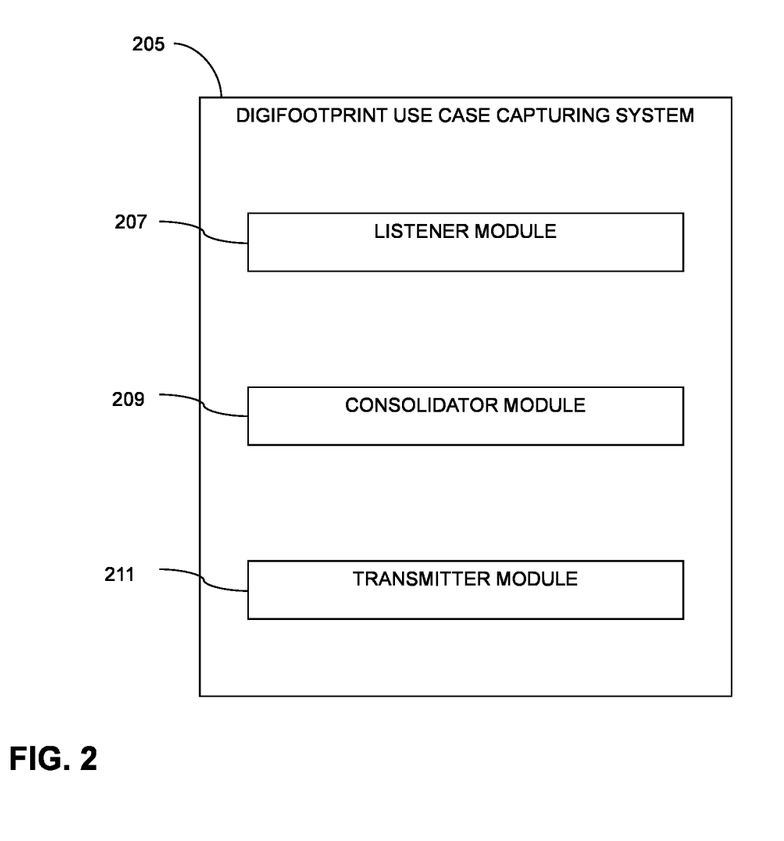
FIG. 2 shows a digifootprint use case capturing system in an illustrative embodiment.

FIG. 2 shows a digifootprint use case capturing system 205 in an illustrative embodiment. In an example embodiment, the digifootprint use case capturing system 205 comprises the listener module 207, consolidator module 209, and transmitter module 211. In an example embodiment, the listener module 207 actively logs the API calls of every client server session with the help of the reverse proxy server 103. In an example embodiment, the listener module 207 retrieves the URI information and argument list form the HTP request sent by the client system 102-N to the server 101, and then stores the information in a data structure. In an example embodiment, the listener module 207 retrieves a status code from the HTTP response and updates the data structure with the status code. In an example embodiment, the listener module 207 evaluates error status codes for server and/or application errors, and reports them out to, for example, the development team. In doing so, the digifootprint use case capturing system 205 accelerates the defect detection and resolution process In an example embodiment, the consolidator module 209 identifies data that have success status codes in the data structure. In an example embodiment, the consolidator module 209 normalizes the data structure to identify any unique sets of actions performed across a plurality of client sessions. In an example embodiment, the consolidator module 209 removes duplicate user actions to identify the unique sets of actions performed across the plurality of client sessions.

In an example embodiment, the transmitter module 211 transmits the normalized test data (i.e., the unique sets of actions performed across the plurality of client sessions) to the automation code repository.

Figure 3:
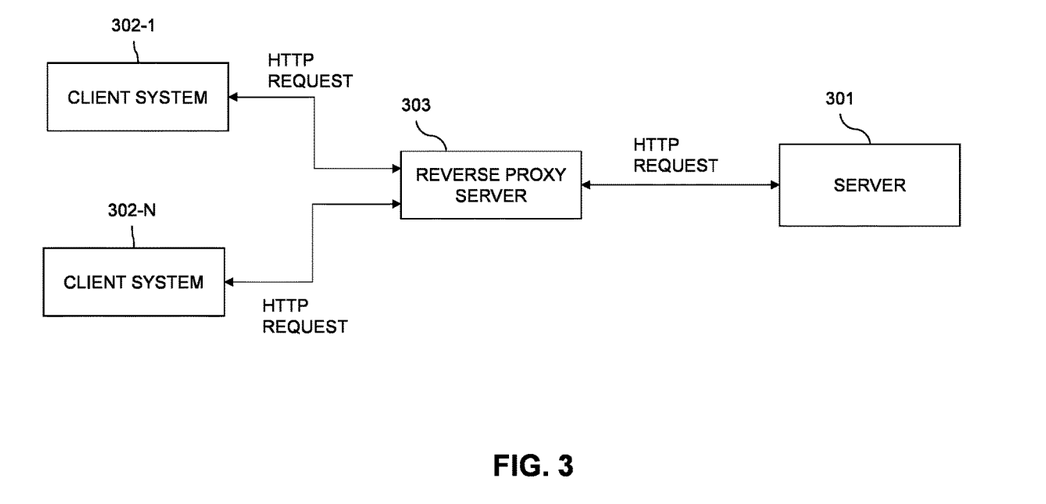
FIG. 3 shows a reverse proxy server interfacing with client systems and a server in an illustrative embodiment.

FIG. 3 shows a reverse proxy server interfacing with client systems and a server in an illustrative embodiment. In an example embodiment, the reverse proxy server 103 intercepts the HTTP request as the HTTP request is transmitted from the client system 302-N to the server 301.

An exemplary process of digifootprint use case capturing system 105 in computer network 100 will be described in more detail with reference to, for example, the flow diagram of FIG. 4. The digifootprint use case capturing system 105 tracks the actions of end users performing user acceptance tests, as well as the actions of actual end users.

Figure 4:
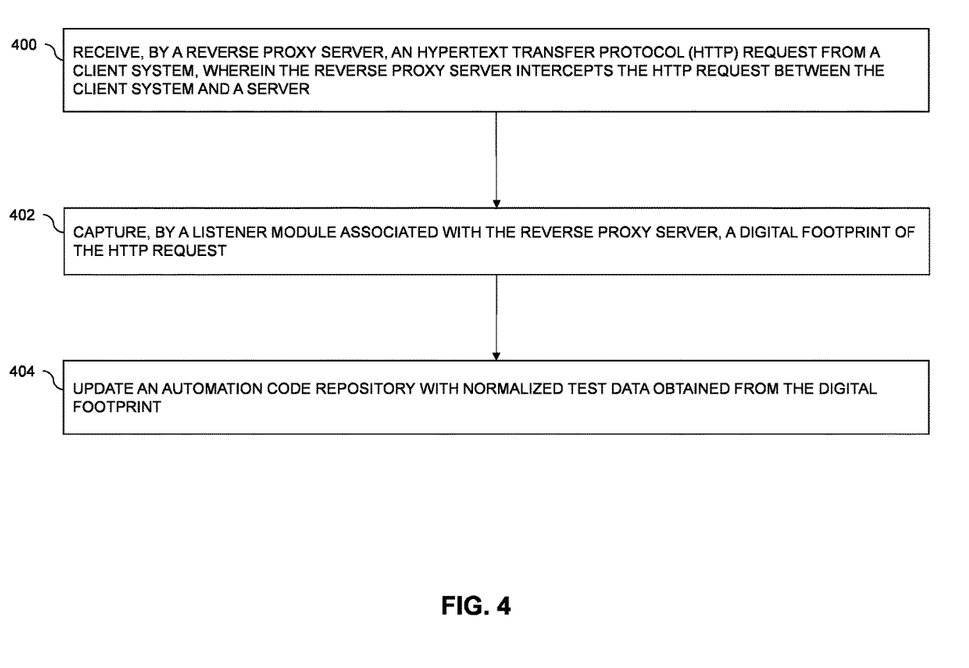
FIG. 4 shows a flow diagram of a process for a digifootprint use case capturing system in an illustrative embodiment.

FIG. 4 is a flow diagram of a process for execution of the digifootprint use case capturing system 105 in an illustrative embodiment. It is to be understood that this particular process is only an example, and additional or alternative processes can be carried out in other embodiments.

At 400, the reverse proxy server 103 receives a HTTP request from a client system, where the reverse proxy server 103 intercepts the HTTP request between the client system and a server as depicted in FIG. 3.

At 402, the listener module 207, associated with the reverse proxy server 103, captures a digital footprint of the HTTP request. In an example embodiment, the listener module 207 logs an API call associated with a client server session, where the client server session comprises the HTTP request intercepted between the client system and the server. In an example embodiment, the listener module 207 retrieves uniform resource identifier (URI) information and an argument list from the HTTP request received from the client system and stores the URI information and the argument list in a data structure. In an example embodiment, the listener module 207 executes $get_url ( ) $get_args ( ) commands to fetch the information along with session information. In an example embodiment, the listener module 207 stores a session identifier, associated with the HTTP request transmitted from the client system to the server, in the data structure.

Figure 5:
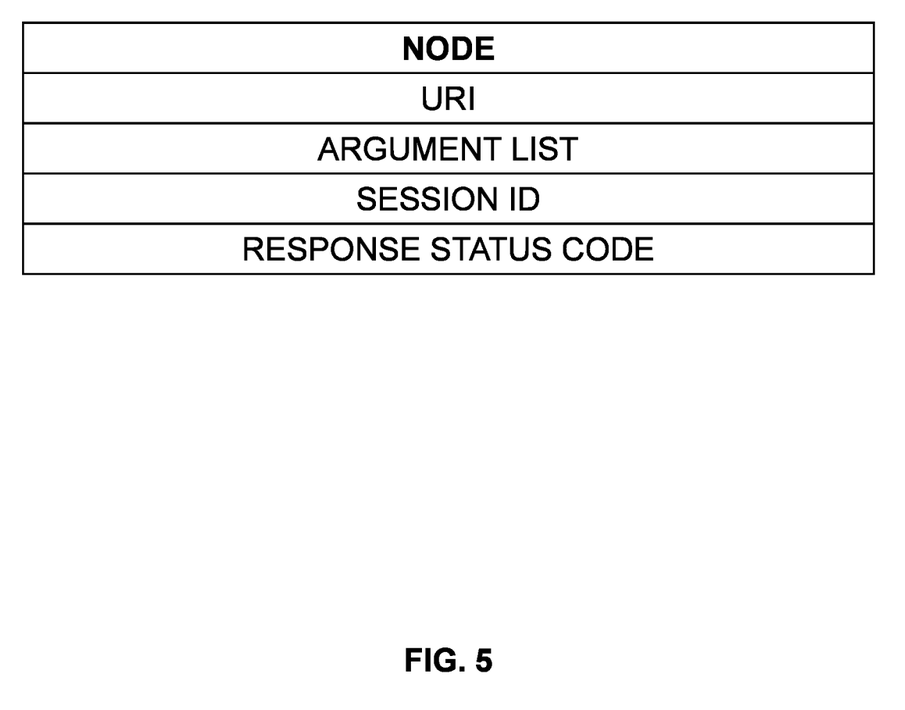
FIG. 5 illustrates an example node data structure in an illustrative embodiment.
Figure 6A:
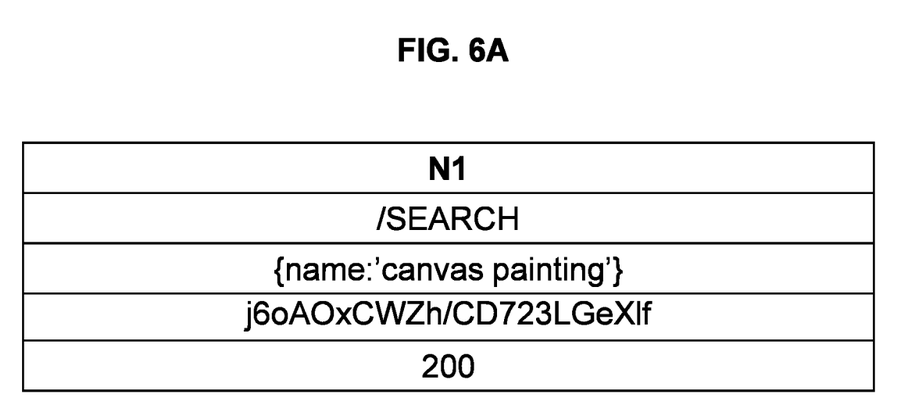
FIGS. 6A and 6B respectively illustrate a node data structure with a success HTTP response and a node structure with an unsuccessful HTTP response in an illustrative embodiment.
Figure 6B:
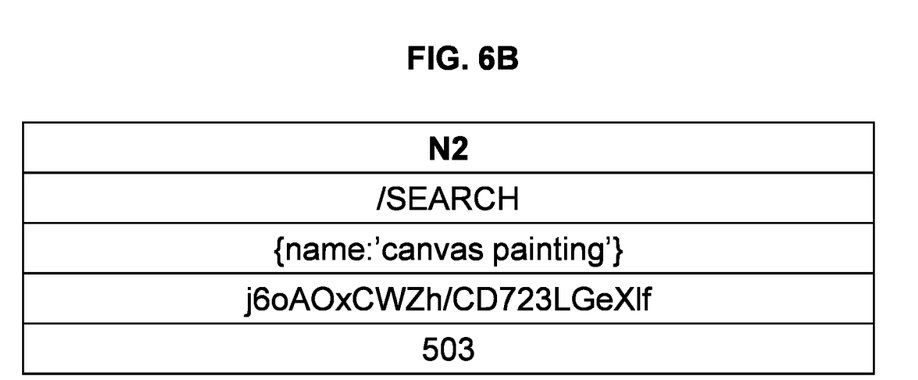

In an example embodiment, the listener module 207 stores the URI information, argument list, and session identifier in a data structure, such as a node data structure as illustrated in FIG. 5 and FIGS. 6A and 6B. In an example embodiment, the listener module 207 captures each user session in a plurality of node data structures, where each data structure contains URI information, argument list, and session identifier. The listener module 207 captures this information within the node data structures until the user session ends.

In an example embodiment, the listener module 207 retrieves a status code associated with an HTTP response, where the HTTP response is received in response to the HTTP request transmitted to the server, and updates a data structure with the status code as illustrated in FIG. 5 and FIGS. 6A and 6B, where FIG. 6A illustrates a success node, and FIG. 6B illustrates a "Service Unavailable Response" node. In other words, the listener module 207 fetches the status code associated with the HTTP response, and updates the corresponding node data structure with the response status code as illustrated in FIG. 5, and FIGS. 6A and 6B.

In an example embodiment, if the digifootprint use case capturing system 105 identifies a status code indicating an unsuccessful HTTP response, the digifootprint use case capturing system 105 immediately reports out a defect, based on an evaluation of the status error of the HTTP response. The defect may be reported out to, for example, a development team that would be tasked with analyzing and resolving the defect. This facilitates early detection of errors, for example, on the server side, and accelerates detection, resolution, and deployment of fixes for the detected errors.

Figure 7:
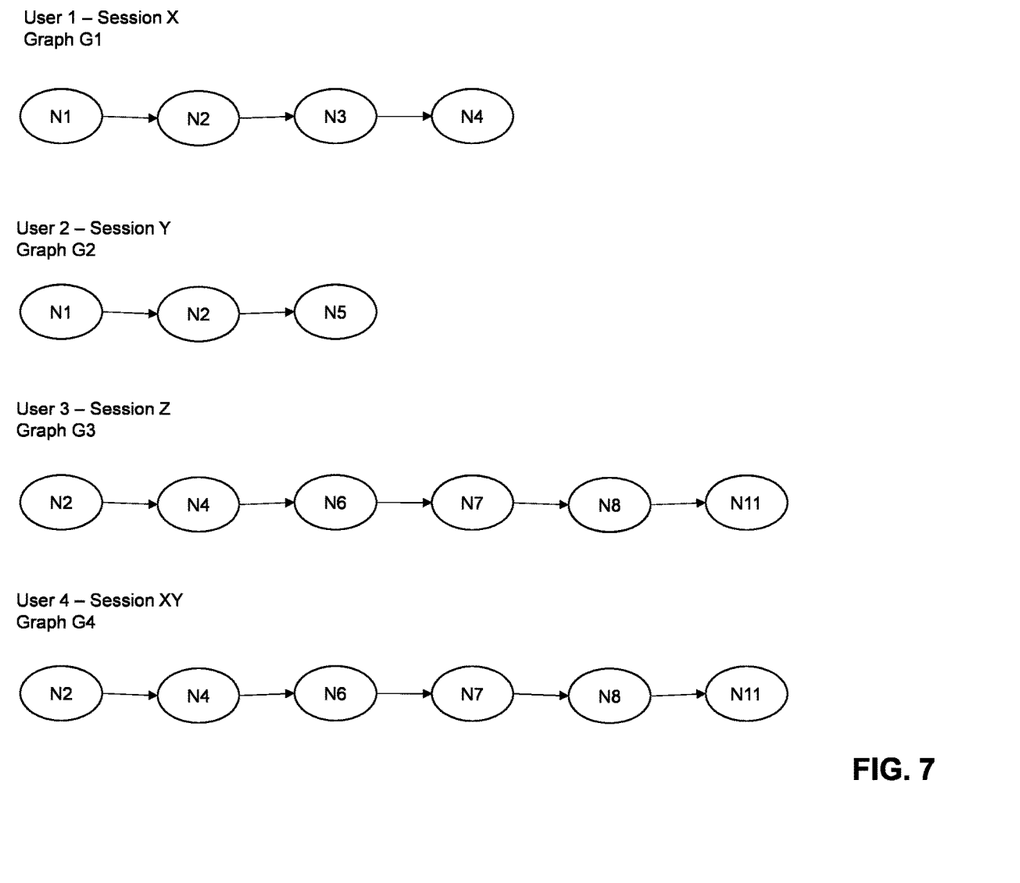
FIG. 7 illustrates example graph data structures in an illustrative embodiment.

In an example embodiment, the listener module 207 stores the plurality of nodes associated with a user session in a graph data structure, as illustrated in FIG. 7, where listener module 207 captures the set of user actions for User 1, User 2, User 3, and User 4. In an example embodiment, the graph data structures represent complex interactions between different elements of the web application, such as pages, buttons, and forms, revealing how users interact with the web application. The graph data structures also identify patterns of end user behavior, and captures the paths that users take as they access the web application. The graph data structures reveal relationships and patterns between the different elements of the web application, such as pages and buttons. In an example embodiment, the graph data structures may identify the areas of the web application that are underutilized.

Figure 8:
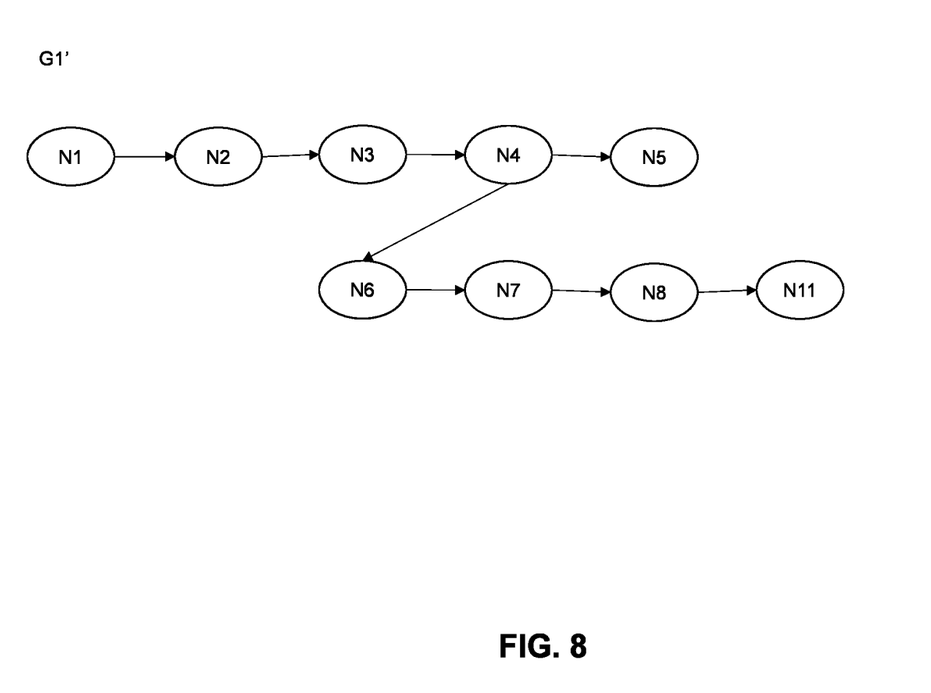
FIG. 8 illustrates a normalized graph data structure in an illustrative embodiment.

In an example embodiment, the consolidator module 209 normalizes a plurality of graphs as illustrated in FIG. 8 where G1' depicts a normalized graph of node data structures G1, G2, G3, and G4, as illustrated in FIG. 7. FIG. 8 illustrates an optimized graph where the node data structures are normalized in sequence to cover all unique data structures. When normalizing the plurality of graph data structures, the consolidator module 209 considers "success" status codes.

At 404, the digifootprint use case capturing system 105 updates an automation code repository with normalized test data obtained from the digital footprint. In an example embodiment, the transmitter module 211 updates the automation code repository with normalized test data in real time as user navigation on the client system invokes the HTTP request. In other words, as a user navigates a web application, the listener module 207, consolidator module 209, and transmitter module 211 work together, as described above, to update the automation code repository, in real time, with normalized test data.

In an example embodiment, the consolidator module 209 identifies a graph data structure associated with a user session on the client system, where the graph data structure is comprised of at least one node data structure. As illustrated in FIG. 7, each graph data structure, such as G1, G2, G3, and/or G4, is comprised of one or more node data structures. In an example embodiment, each of the node data structures in a graph data structure comprises a session identifier associated with the user session, URI information, an argument list from the HTTP request, and a status code associated with an HTTP response, where the HTTP response is received in response to the HTTP request transmitted to the server as illustrated in FIGS. 6A and 6B.

In an example embodiment, the consolidator module 209 analyzes a plurality of graph data structures, where each graph data structure is comprised of a plurality of node data structures and identifies a subset of the plurality of the graph data structures that are associated with a success status code. The success status code is associated with an HTTP response received in response to the HTTP request transmitted to the server. In an example embodiment, each of the plurality of node data structures associated with a graph data structure is associated with a session id associated with the HTTP request.

In an example embodiment, the consolidator module 209 normalizes the subset of the plurality of the graphs associated with the success status codes, and removes duplicates from the normalized subset of the plurality of graphs as illustrated in FIG. 8.

In an example embodiment, the consolidator module 209 generates normalized test data from the normalized subset of the plurality of graphs by appending a respective API URI and argument list to each of the normalized subset of the plurality of graphs. In an example embodiment, the consolidator module 209 then transmits the normalized test data to the automation code repository.

In an example embodiment, the consolidator module 209 then deduplicates the normalized test data with test data in the automation code repository to eliminate redundant sets of actions. In an example embodiment, use cases provided by a user accessing the web application comprise a series of API calls that correspond to the user's actions within the web application. If the test data obtained by the digifootprint use case capturing system 105 is not a part of the automated test cases, this indicates increased test coverage is needed, and additional test scripts need to be developed. Thus, the digifootprint use case capturing system 105 increases test coverage with real time use cases and facilitates testing using real time test data to improve the customer satisfaction of end users of the web application.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate test data in web applications. These and other embodiments can effectively improve the test coverage and increase the probability of detecting defects relative to conventional approaches. Embodiments disclosed herein provide the quality assurance team with real time test data and test scenarios that come directly from end users, thereby increasing the business risk coverage and early detection of defects. Embodiments disclosed herein generate test data by intercepting user actions and obtaining real time test data from API calls, optimizing the real time test data. Embodiments disclosed herein provide self-service test data to an automation code repository. Embodiments disclosed herein reduce overall testing efforts by generating self-service test data in real time. Embodiments disclosed herein improve accuracy by minimizing production defects using the real time test data from the production environment. Embodiments disclosed herein improve accuracy by covering key business testing areas through the use of the real time test data from the production environment. Embodiments disclosed herein increase efficiency by obtaining test data from domain experts and actual users, thereby maximizing the testing of key scenarios for business. Embodiments disclosed herein increase efficiency by reducing the over-testing of areas that are not key scenarios for business. Embodiments disclosed herein generate test data for functional and non-functional testing, such as load testing and/or stress testing. Embodiments disclosed herein allow users to create and run tests on their own schedule. Embodiments disclosed herein provide self-service testing systems that allow multiple users to work together on the same test, thereby making it easier to share knowledge and ideas, and to collaborate on the testing process. Embodiments disclosed herein provide self-service testing systems that are more scalable than traditional testing methods, since users can create and run tests on their own, without needing to rely on a dedicated testing team to create the necessary tests. Embodiments disclosed herein provide self-service testing systems that eliminate the need for manual testing and reduce the number of manual testers needed. Embodiments disclosed herein provide test data as close to production data as possible for meaningful UAT results. Embodiments disclosed herein increase the coverage of testing with real time data. Embodiments disclosed herein increase the probability of uncovering defects and updating Automation Test Scripts with any new or updated web elements in the web applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of the information processing system 100, these platforms may also be used to implement at least portions of other information processing systems in other embodiments.

Figure 9:
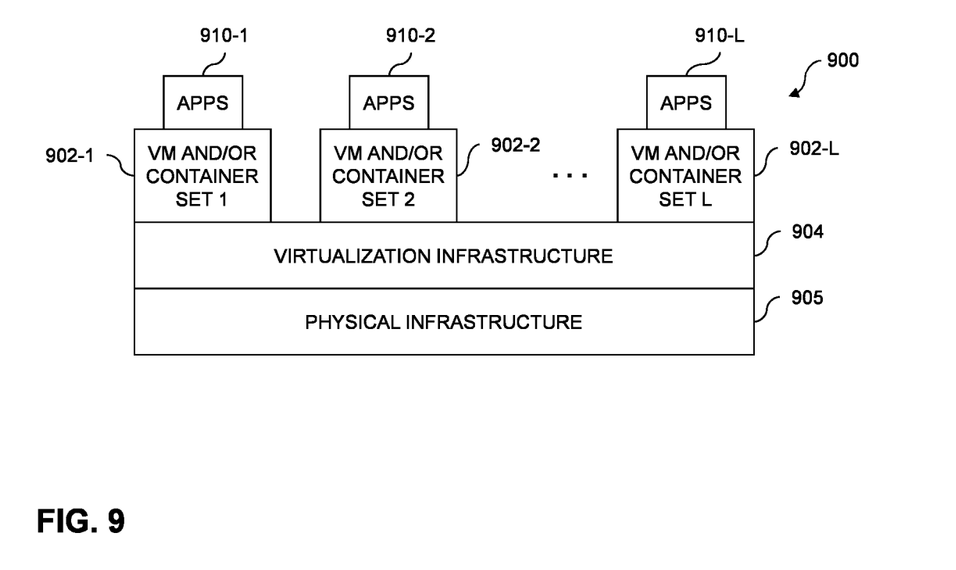
FIGS. 9 and 10 show examples of processing platforms that may be utilized to implement at least a portion of a digifootprint use case capturing system embodiments.
Figure 10:
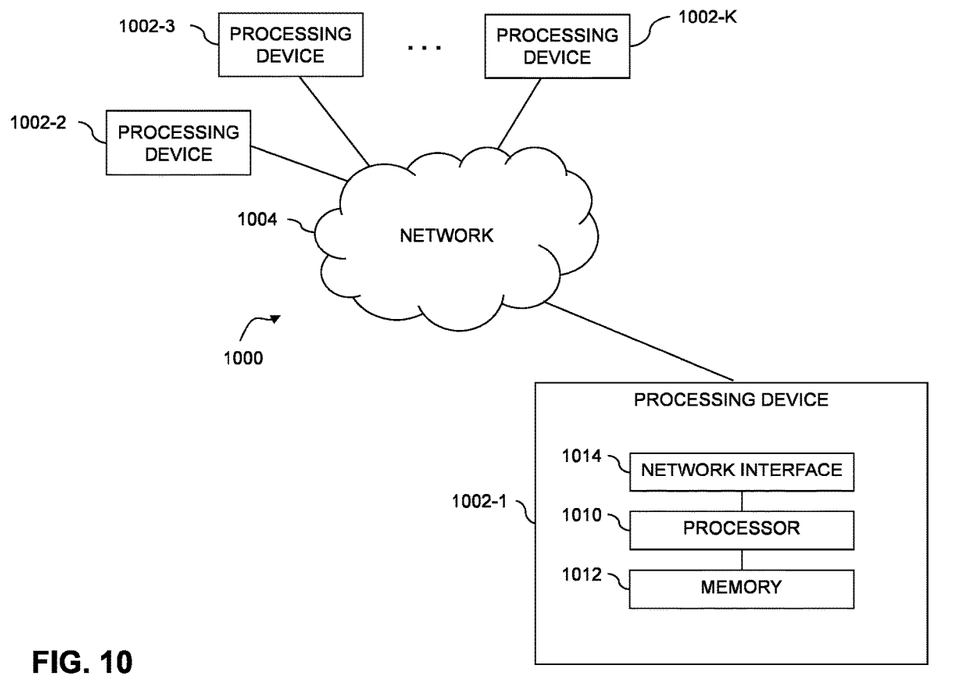

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, where the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of the information processing system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 804 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   receiving, by a reverse proxy server, a Hypertext Transfer Protocol (HTTP) request from a client system, wherein the reverse proxy server intercepts the HTTP request between the client system and a server;
   capturing, by a listener module associated with the reverse proxy server, a digital footprint of the HTTP request; and
   updating an automation code repository with normalized test data obtained from the digital footprint, wherein a subset of a plurality of graph data structures is associated with a success status code, wherein the success status code is associated with an HTTP response received in response to the HTTP request transmitted to the server, wherein the method is performed by at least one processing device comprising a processor coupled to a memory.

2. The method of claim 1 wherein capturing, by the listener module associated with the reverse proxy server, the digital footprint of the HTTP request comprises:
   logging, by the listener module, an API call associated with a client server session, wherein the client server session comprises the HTTP request intercepted between the client system and the server.

3. The method of claim 1 wherein capturing, by the listener module associated with the reverse proxy server, the digital footprint of the HTTP request comprises:

retrieving uniform resource identifier (URI) information and an argument list from the HTTP request received from the client system; and storing the URI information and the argument list in a data structure.

4. The method of claim 1 wherein capturing, by the listener module associated with the reverse proxy server, the digital footprint of the HTTP request comprises:

retrieving a status code associated with the HTTP response, wherein the HTTP response is received in response to the HTTP request transmitted to the server; and updating a data structure with the status code.

5. The method of claim 4 wherein the data structure comprises URI information and an argument list from the HTTP request.

6. The method of claim 1 wherein capturing, by the listener module associated with the reverse proxy server, the digital footprint of the HTTP request comprises:

storing a session identifier, associated with the HTTP request transmitted from the client system to the server, in a data structure.

7. The method of claim 6 wherein the data structure comprises URI information, an argument list from the HTTP request, and a status code associated with the HTTP response, wherein the HTTP response is received in response to the HTTP request transmitted to the server.

8. The method of claim 1 wherein updating the automation code repository with normalized test data obtained from the digital footprint comprises:

updating the automation code repository with normalized test data in real time as user navigation on the client system invokes the HTTP request.

9. The method of claim 1 wherein a graph data structure of the plurality of the graph data structures is associated with a user session on the client system, wherein the graph data structure is comprised of at least one node data structure.

10. The method of claim 9 wherein the at least one node data structure comprises a session identifier associated with the user session, URI information, an argument list from the HTTP request, and a status code associated with the HTTP response, wherein the HTTP response is received in response to the HTTP request transmitted to the server.

11. The method of claim 1 wherein each graph data structure of the plurality of graph data structures is comprised of a plurality of node data structures.

12. The method of claim 11 wherein each of the plurality of node data structures associated with the each graph data structure is associated with a session id associated with the HTTP request.

13. The method of claim 11 further comprising:

normalizing, by a consolidator module, the subset of the plurality of the graphs associated with the success status codes.

14. The method of claim 13 further comprising:

removing duplicates from the normalized subset of the plurality of graphs.

15. The method of claim 13 further comprising:

generating normalized test data from the normalized subset of the plurality of graphs.

16. The method of claim 15 wherein generating the normalized test data comprises:

appending a respective API URI and argument list to each of the normalized subset of the plurality of graphs.

17. The method of claim 15 further comprising:

transmitting the normalized test data to the automation code repository.

18. The method of claim 17 wherein transmitting the normalized test data to the automation code repository comprises:

deduplicating the normalized test data with test data in the automation code repository.

19. A system comprising:

at least one processing device comprising a processor coupled to a memory;

the at least one processing device being configured:

to receive, by a reverse proxy server, a Hypertext Transfer Protocol (HTTP) request from a client system, wherein the reverse proxy server intercepts the HTTP request between the client system and a server;

to capture, by a listener module associated with the reverse proxy server, a digital footprint of the HTTP request; and to update an automation code repository with normalized test data obtained from the digital footprint, wherein a subset of a plurality of graph data structures is associated with a success status code, wherein the success status code is associated with an HTTP response received in response to the HTTP request transmitted to the server.

20. A computer program product comprising a non-transitory processor-readable storage medium having stored therein program code of one or more software programs, wherein the program code when executed by at least one processing device causes said at least one processing device:

to receive, by a reverse proxy server, a Hypertext Transfer Protocol (HTTP) request from a client system, wherein the reverse proxy server intercepts the HTTP request between the client system and a server;

to capture, by a listener module associated with the reverse proxy server, a digital footprint of the HTTP request; and to update an automation code repository with normalized test data obtained from the digital footprint, wherein a subset of a plurality of graph data structures is associated with a success status code, wherein the success status code is associated with an HTTP response received in response to the HTTP request transmitted to the server.

* * * * *